United States Patent [19]

Nance et al.

[11] Patent Number: 4,517,100
[45] Date of Patent: May 14, 1985

[54] LUBRICATING WELLBORE FLUID AND METHOD OF DRILLING

[75] Inventors: Weldon B. Nance, Lafayette, La.; Jack M. Calkins, Houston, Tex.

[73] Assignee: Witco Chemical Corporation, New York, N.Y.

[21] Appl. No.: 464,631

[22] Filed: Feb. 7, 1983

[51] Int. Cl.$^3$ .......................... C09K 7/02; C09K 7/06; C10M 3/24; C10M 3/32
[52] U.S. Cl. ............................ 252/8.5 C; 252/8.5 P; 252/45; 252/49.3
[58] Field of Search ............... 252/8.5 C, 8.5 P, 49.3, 252/45

[56] References Cited

U.S. PATENT DOCUMENTS

| | | | |
|---|---|---|---|
| 2,773,031 | 12/1956 | Tailleur | 252/8.5 P |
| 3,014,862 | 12/1961 | Tailleur | 252/8.5 C |
| 3,027,324 | 3/1962 | Rosenberg | 252/8.5 C |
| 3,214,374 | 10/1965 | Sample | 252/8.5 C X |
| 3,712,393 | 1/1973 | Sheldahl et al. | 252/8.5 C X |
| 3,852,201 | 12/1974 | Jackson | 252/8.5 A |
| 4,172,800 | 10/1979 | Walker | 252/49.3 X |
| 4,200,543 | 4/1980 | Liston et al. | 252/45 |

OTHER PUBLICATIONS

Rosenberg, M., and Tailleur, R. J., "Increased Drill Bit Life Through the Use of Extreme Pressure Lubricant Drilling Fluids", *Journal of Petroleum Technology*, vol. 216, 1959, pp. 195-202.

*Primary Examiner*—Ben R. Padgett
*Assistant Examiner*—Virginia B. Caress
*Attorney, Agent, or Firm*—Kenneth H. Johnson

[57] ABSTRACT

A wellbore fluid having improved lubricating properties for drilling in formations in the earth comprising water and a lubricant composition containing a mixture of a chlorinated component and a sulfurized component in proportions to produce a lubricant composition containing 15 to 30 weight percent chlorine and 2 to 10 weight percent sulfur.

20 Claims, No Drawings

LUBRICATING WELLBORE FLUID AND METHOD OF DRILLING

BACKGROUND OF THE INVENTION

1. Field of the Invention

The present invention relates to wellbore fluids having improved lubricating properties for use as drilling fluids.

2. Related Art

The most common method of drilling oil wells is one known as the hydraulic rotary drilling method. This method consists of rotating a cutting bit, comprising individual cone bits, which is attached at the bottom of a hollow drill string of the pipe and drill collars to progressively chip away the layers of earth. It has long been the practice to circulate a drilling fluid down through the hollow drill pipe, across the face of the drill bit and upward through the drill hole, to clear the teeth of accumulated dirt, and thence out into the annulus formed between the wall of the well which is being drilled and the exterior of the drill string. The principal functions of this process are to wet and lubricate the bit and drill pipe and to clean the hole bottom by carrying away the cuttings. In certain instances the drilling fluid may also serve to deposit an impermeable wall cake, to prevent caving of the formation from hydration of water-soluble shales and to overcome formation pressures.

There are several types of wellbore fluids used in drilling workover, completion, etc. Briefly, these are oil, oil-in-water emulsions, water-in-oil emulsions, predominantly aqueous fluids, which include clear water, brines (from about 1 weight % soluble salts through saturated solutions) aqueous clay based (called muds), and air (sometimes called foams). Because of the multiplicity of functions which drilling fluids must serve, they are usually comprised of a basic heat transfer and lubricating fluid in which is dispersed one or more additives to modify the properties of the formation being drilled through and therefore the secondary functions which the drilling fluid must also serve. It may contain materials to increase density, to change viscosity, seal the formation, reduce fluid loss, scavenge contaminates, stabilize formation shale and clays, emulsify, inhibit corrosion, inhibit bacteria, lubricate and flocculate.

The environment of the wellbore is, to say the least, hostile, in that extremes of heat and pressure are often encountered, with the multitude and complexity of the problems to be encountered and handled (primarily by the drilling fluid) as diverse as the formations drilled.

The problem to which the present invention is directed is as serious and costly as any other, however, not so dramatic as a blowout or as common as fluid loss (to the drilled formation). The problem here addressed is the seizing of the pipe string in the wellbore. When this occurs, the well may be lost since it is not possible to drill further. When this happens, it may be possible to use some of the available "fishing tools" to free the pipe, however, most likely the pipe and bit are lost and a new bore is drilled.

The seizing of the string can readily occur because the string is not straight in the bore but makes constant contact with the sides of the bore as the string is rotated. There may be several points of contact and any one or more of these may bind with the wall of the bore or increase the torque on the string.

It is an advantage of the present invention, that the seizing or binding of the drill string in the wellbore is reduced or eliminated and torque and drag are reduced. It is a further advantage of the present invention that the drill string is lubricated in the wellbore to facilitate rotation. It is a feature of the present wellbore fluids that they have improved lubrication to other similar fluid. It is a further advantage of the present wellbore fluids that improved lubrication is not obtained at the loss of other desired characteristics of the fluids. A further advantage of the present invention is that oil wetting (foaming) is relatively low.

SUMMARY OF THE INVENTION

The present wellbore fluid composition and method deals with fluids, which are aqueous containing about 0.5 to 5 volume % preferably 1 to 2 volume % of a lubricant composition comprising a mixture of:

(a) a chlorinated component of chlorinated normal paraffins having 9 to 20 carbon atoms, chlorinated esters of fatty acids, chlorinated waxes, chlorinated olefins or mixtures thereof, and (b) a sulfurized component of sulfurized fatty acid, sulfurized esters of fatty acids, sulfurized polymerized fatty acids, sulfurized olefins, or mixtures thereof, in proportions to produce a composition containing 15 to 30 weight percent chlorine and 2 to 10 weight percent sulfur.

The term "esters of fatty acids" as used herein, includes the esters derived from glycerol, i.e., the triglycerides of fatty acids. The term "waxes" as used herein includes both slack waxes and refined waxes.

The aqueous portion of the present wellbore fluids may be clear water, seawater, brines, formation water, or the like.

The method according to the present invention is the method of drilling a well with an aqueous wellbore fluid containing from 0.5 to 5 volume percent of the described chlorinated and sulfurized materials in a subterranean formation comprising pumping said wellbore fluid into said well through a drill stem and returning said wellbore fluid to the surface through an annulus between said subterranean formation and said drill stem, thereby lubricating said drill stem and reducing or eliminating the seizing of said drill stem in said well, removing drilling particles from the said wellbore fluid and recirculating said cleaned up wellbore fluid to said well.

DETAILED DESCRIPTION OF THE INVENTION

It should be appreciated there are various means and apparatus for removing drilled particles from the wellbore fluid and any of these methods may be used, e.g., shaker screens, settling ponds, filters, flocculants and the like. It should also be appreciated the so-called nonthixotropic wellbore fluids, i.e., having no structured viscosity, and the thixotropic type of fluids are cleaned up in somewhat different manners. That is, the thixotropic fluids are agitated to allow particle settling, whereas nonthixotropic fluids (represented by those containing hydroxyalkyl cellulose such as hydroxyethyl cellulose (HEC)) are quiescent during settling. The nonthixotropic fluids are characterized by high flat gel strengths, i.e., there is little change in viscosity and initial gel strength when agitated. Thixotropy is also termed gel strength, and is a reversible gel wherein structure builds up when the mud is quiescent and then breaks back down when the gelled fluid is agitated.

The thixotropic or structured type of fluids are represented by clay based fluids, such as bentonite clays.

The nonthixotropic fluids are frequently brines. As the term brine is employed here, it means at least 1% by weight of soluble salt of potassium, sodium or calcium in water. In addition, the brine may contain other soluble salts of, for example, zinc, chromium, iron, copper and the like. Generally, the chlorides are employed because of availability, but other salts such as the bromides, sulfates and the like can be used. The soluble salts of the brine not only furnish weighting material by adjusting the density of the solution, but also typically furnish the cations for inhibiting the fluid against hydration of solid materials. The brines are substantially free of clay, i.e., argillaceous material, but may contain, in addition, the lubricating composition of the present invention, starch, other conventional wellbore additives, such as oil for producing water-in-oil or oil-in-water emulsions, viscosifiers such as hydroxyethyl cellulose, gums, and the like, lignosulfonate salts such as calcium or chromium lignosulfonates, emulsifiers, weighting agents, calcium carbonate, magnesia and other agents. It is understood that not all of these possible constituents will be present in any one wellbore fluid but their selection and use will be governed by other constituents and the use for which the wellbore fluid is intended.

The clay based fluids may contain the same additives including the nonthixotropic viscosifier or thixotropic viscosifier but less brine forming salts. The clay is usually a material which is capable of hydrating in the aqueous system, although asbestos, which does not hydrate to an appreciable extent, may be used to form a structured type of viscosity and be classified as a mud.

The clay is employed in an amount which will obtain desired weight and carrying capacity, for example, some muds weigh 80 pounds per cubic foot or more (fresh water weighs about 62 pounds per cubic foot).

Similarly nonthixotropic viscosifiers are added in amounts to obtain the desired viscosity. Generally, this would be about 0.5 to 10 lbs per barrel of fluid. Such viscosifiers include in addition to hydroxy alkyl cellulose, various natural gums such as quar gum or hydroxy alkyl quar gum, hydroxylzed polyamides and the like.

It has also been found that the addition of sulfurized asphalt to the wellbore fluid produces a further improvement in the reduction of torque in the amounts of 1 to 8 pounds of sulfurized asphalt per barrel of wellbore fluid.

EXAMPLE I

A lubricant composition as described above was evaluated in both a fresh water and seawater lignosulfonate mud. The mud composition was as follows:

|  | Fresh Water Mud | Seawater Mud |
| --- | --- | --- |
| Wyoming Bentonite lb/bbl | 22 | 20 |
| Martin No. 5 Ball Clay, lb/bbl | 25 | 100 |
| Ferrochrome Lignosulfonate lb/bbl | 3 | 7 |
| pH | 11 | 11 |
| Seasalt, lb/bbl | — | 14.7 |

The lubricant according to the present invention which was used in these examples was a mixture of chlorinated organic material with a sulfurized organic material in proportions giving 25% by weight chlorine and 5% by weight sulfur, manufactured and sold by Pearsall Chemical Division, Witco Chemical Corporation, Houston, Tex., under the tradename OA 900, having as typical properties a specific gravity of 1.10 at 60° F., viscosity, SUS @ 100° F. of 1000, flashpoint COC .° F. .350 minimum and pour point °F. of +35. The lubricant composition was evaluated relative to a popular commercial mud lubricant with a Falex lubricant tester, manufactured by the Farille-Levally Corporation. This apparatus measures torque at increasing pressure loads that are applied to a journal-V block assembly. The assembly is submerged in the mud sample to be tested. The mud is circulated at a constant rate to prevent heat buildup. A load of 100 pounds is maintained on the V-block assembly for a 3-minute interval, and a torque reading is taken. This procedure is repeated at loads in 100 pound increments up to 800 pounds. Lubrication properties are evaluated by comparing the torque measurements in a sample of the base mud to those obtained in a sample treated with the lubricant to be evaluated. The journal can also be weighed before and after the test and the journal weight loss due to friction wear as measured by weight loss is a more quantitative measurement and may relate well to field performance. The lubricant composition of this invention is compared to a commercial mud lubricant in Tables 1 and 2 below. Lubricant concentrations are 1% by volume.

TABLE 1

LUBRICANTS IN FRESH WATER MUD

| Journal Load, lb/in$^2$ | Torque, inch - pounds | | |
| --- | --- | --- | --- |
| | Base Mud | Base Mud + 1% Lubricant Invention | Base Mud + 1% Commercial Lubricant |
| 100 | 0 | 0 | 1 |
| 200 | 6 | 0 | 9.5 |
| 300 | 10 | 0 | 20 |
| 400 | 15 | 0 | 31.5 |
| 500 | 21.5 | 0 | 40.5 |
| 600 | 27 | 0.5 | 50 |
| 700 | 31.5 | 1.0 | 55 |
| 800 | 35.5 | 1.5 | 62 |
| Weight Loss, mg. | 495.2 | 10.1 | 47.2 |

TABLE 2

LUBRICANTS IN SEAWATER MUD

| Journal Load, lb/in$^2$ | Torque, inch - pounds | | |
| --- | --- | --- | --- |
| | Base Mud | Base Mud + 1% Lubricant Invention | Base Mud + 1% Commercial Lubricant |
| 100 | 0 | 1 | 0 |
| 200 | 0 | 1 | 1.5 |
| 300 | 0.5 | 1.5 | 5 |
| 400 | Seizure | 3 | 10 |
| 500 | — | 7 | 16 |
| 600 | — | 10.5 | 24 |
| 700 | — | 15 | 31 |
| 800 | — | 20 | 37 |
| Weight Loss, mg. | 30.3 till Seizure | 7.6 | 264.4 |

EXAMPLE II

It has also been found that the lubricant invention has a synergistic action with a commercially available sulfonated asphalt which results in an improvement in performance when the two are used together. Such a product is sold under the tradename "Soltex" and is distributed by Drilling Specialties Co. Table 3 shows the improved effect of Soltex and the wellbore fluid of the invention.

TABLE 3

LUBRICANT IN SEAWATER MUD WITH SOLTEX

| | Torque, inch - pounds | | |
|---|---|---|---|
| Journal Load, lb/in$^2$ | Base Mud 4 lb/bbl soltex | Base Mud + 1% Lubricant Invention | Base Mud + 4 lb/bbl Soltex + 1% Lubricant |
| 100 | 1 | 1 | 0 |
| 200 | 3 | 1 | 5 |
| 300 | 4 | 1.5 | 5 |
| 400 | Seizure | 3 | 4 |
| 500 | | 7 | 3 |
| 600 | | 10.5 | 4.5 |
| 700 | | 15 | 6.5 |
| 800 | | 20 | 10 |
| Weight Loss, mg. | 51.2 till Seizure | 7.6 | 7.4 |

EXAMPLE III

A field test of the lubricant was performed by adding 1% of the lubricant invention to the seawater-lignosulfonate mud employed on a well in the Mustang Island area offshore Texas. Rotary torque was running high at 500-700 amps and stalling out of the rotary due to the high torque was occurring. The torque was reduced to 350-400 amps immediately after adding the lubricant invention and drilling resumed without torque problems.

EXAMPLE IV

A further advantage of the lubricant is its ability to add lubricity to a mud without contributing to oil wetting of solids. Oil wetting of solids has been a common problem in many commercial mud lubricants because of their tendency to form soaps on reaction with divalent cations such as calcium. This problem has been particularly severe in high density muds containing large amounts of minerals such as barite. A test commonly run to determine oil wetting tendency of a lubricant involves adding 2% of the lubricant to a barite-water slurry prepared by mixing 35-ml. water, 150 g. barite, 2% lubricant, 2 g. gypsum (calcium sulphate hydrate) and enough sodium hydroxide to raise pH to 11. The mixture is stirred 5 minutes on a Hamilton Beach Multimixer and then poured into a glass graduated cylinder. The height of foam above the liquid slurry is then measured. Lubricants which tend to promote oil wetting show higher foam levels. Table 4 compares the lubricant of this invention with several of the most widely used commercial mud lubricants.

TABLE 4

BARITE OIL WETTING TEST

| | Blank Slurry | Lubricant Invention | Commercial Lubricant A | Commercial Lubricant B | Commercial Lubricant C |
|---|---|---|---|---|---|
| Foam Height, ml. | 0 | 10 | 35 | 80 | 105 |

The invention claimed is:

1. An aqueous wellbore fluid composition comprising water and as the sole lubricating component 0.5 to 5 volume % of a lubricant composition consisting of a mixture of:
   (a) a chlorinated component of chlorinated normal paraffins having 9 to 20 carbon atoms, chlorinated esters of fatty acids, chlorinated waxes, chlorinated olefins or mixtures thereof, and
   (b) a sulfurized component of sulfurized fatty acids, sulfurized esters of fatty acids, sulfurized polymerized fatty acids, sulfurized olefins or mixtures thereof, in proportions to produce a lubricant composition containing 15 to 30 weight percent chlorine and 2 to 10 weight percent sulfur.

2. The wellbore fluid according to claim 1 containing from 1 to 2 volume % of said lubricant composition.

3. The wellbore fluid according to claim 1 additionally containing clay as a viscosifier.

4. The wellbore fluid according to claim 1, containing at least one weight percent of a soluble salt.

5. The wellbore fluid according to claim 4 containing a nonthixotropic viscosifier.

6. The wellbore fluid according to claim 5 wherein said wellbore fluid is a brine.

7. The wellbore fluid according to claim 3 wherein said fluid contains seawater.

8. The wellbore fluid according to claim 1 wherein said lubricant composition is a mixture of chlorinated component and sulfurized component in proportions giving about 25 weight % chlorine and about 5 weight % sulfur.

9. A method of drilling a well in a subterranean formation with an aqueous wellbore fluid containing as the sole lubricating component from 0.5 to 5 volume % of a lubricant composition consisting of a mixture of:
   (a) chlorinated component of chlorinated normal paraffins having 9 to 20 carbon atoms, chlorinated esters of fatty acids, chlorinated waxes, chlorinated olefins, or mixtures thereof, and
   (b) a sulfurized component of sulfurized fatty acids, sulfurized esters of fatty acids, sulfurized polymerized fatty acids, sulfurized olefins, or mixtures thereof, in proportion to produce a lubricant composition containing 15 to 30 weight percent chlorine and 2 to 10 weight percent sulfur, comprising pumping said wellbore fluid into said well through a drill stem and returning said wellbore fluid to the surface through an annulus between said subterranean formation and said drill stem, thereby lubricating said drill stem and reducing or eliminating the seizing of said drill stem in said well, removing drilling particles from the said wellbore fluid and recirculating said cleaned up wellbore fluid to said well.

10. The method according to claim 9 wherein 1 to 2 volume % of said lubricant composition is present.

11. The method according to claim 9 wherein from 1 to 8 pounds of sulfurized asphalt per barrel of fluid is present.

12. The method according to claim 10 wherein said wellbore fluid additionally contains clay as a viscosifier.

13. The method according to claim 10 wherein said wellbore fluid contains at least one weight percent of a soluble salt.

14. The method according to claim 13 wherein said wellbore fluid contains a nonthixotropic viscosifier.

15. The method according to claim 13 wherein said wellbore fluid contains seawater.

16. The method according to claim 9 wherein said lubricant composition is a mixture of chlorinated component and sulfurized component in proportions giving about 25 weight % chlorine and about 5 weight % sulfur.

17. The method according to claim 16 wherein said wellbore fluid additionally contains clay as a viscosifier.

18. The method according to claim 16 wherein said wellbore fluid contains seawater.

19. An aqueous fluid composition comprising water and as the sole lubricating component (1) 0.5 to 5 volume % of a lubricant composition consisting of a mixture of:
(a) a chlorinated component of chlorinated normal paraffins having 9 to 20 carbon atoms, chlorinated esters of fatty acids, chlorinated waxes, chlorinated olefins or mixtures thereof, and
(b) a sulfurized component of sulfurized fatty acids, sulfurized esters of fatty acids, sulfurized polymerized fatty acids, sulfurized olefins or mixtures thereof, in proportions to produce a lubricant composition containing 15 to 30 weight percent chlorine and 2 to 10 weight percent sulfur and (2) from 1 to 8 pounds of sulfurized asphalt per barrel of wellbore fluid.

20. A method of drilling a well in a subterranean formation with an aqueous wellbore fluid containing as the sole lubricating component (1) from 0.5 to 5 volume % of a lubricant composition consisting of a mixture of:
(a) a chlorinated component of chlorinated normal paraffins having 9 to 20 carbon atoms, chlorinated esters of fatty acids, chlorinated waxes, chlorinated olefins, or mixtures thereof, and
(b) a sulfurized component of sulfurized fatty acids, sulfurized esters of fatty acids, sulfurized polymerized fatty acids, sulfurized olefins, or mixture thereof, in proportions to produce a lubricant composition containing 15 to 30 weight percent chlorine and 2 to 10 weight percent sulfur and (2) from 1 to 8 pounds of sulfurized asphalt per barrel of wellbore fluid, comprising pumping said wellbore fluid into said well through a drill stem and returning said wellbore fluid to the surface through an annulus between said subterranean formation and said drill stem, thereby lubricating said drill stem and reducing or eliminating the seizing of said drill stem in said well, removing drilling particles from the said wellbore fluid and recirculating said cleaned up wellbore fluid to said well.

* * * * *